United States Patent [19]
Brundage et al.

[11] Patent Number: 4,553,732
[45] Date of Patent: Nov. 19, 1985

[54] SOLENOID CONTROLLED FLOW VALVE

[76] Inventors: Robert W. Brundage, 135 Paradise Rd.; Gene Swatty, 182 Grenney La., both of Painesville, Ohio 44077

[21] Appl. No.: 579,571

[22] Filed: Feb. 13, 1984

[51] Int. Cl.$^4$ ............................................. F16K 11/10
[52] U.S. Cl. .................................. 251/30.01; 251/33; 251/43
[58] Field of Search .................. 335/281, 262; 251/33, 251/38, 43, 205, 30

[56] References Cited

U.S. PATENT DOCUMENTS

| | | | |
|---|---|---|---|
| 2,758,812 | 8/1956 | Marcy et al. | 251/44 |
| 3,069,846 | 12/1962 | Buescher | 60/35.6 |
| 3,250,294 | 5/1966 | Hipple | 137/528 |
| 3,460,081 | 8/1969 | Tillman | 335/234 |
| 3,667,722 | 6/1972 | Katz et al. | 251/30 |
| 3,788,597 | 1/1974 | Ichioka | 251/129 |
| 3,900,822 | 8/1975 | Hardwick et al. | 335/268 |
| 4,206,781 | 6/1980 | Salter | 137/504 |
| 4,236,690 | 12/1980 | Smilges et al. | 251/30 |
| 4,305,566 | 12/1981 | Grawunde | 251/30 |
| 4,429,708 | 2/1984 | Strueh | 137/117 |
| 4,452,424 | 6/1984 | Kawata | 251/129 |
| 4,478,245 | 10/1984 | Bender | 137/554 |

OTHER PUBLICATIONS

John Pippenger et al., *Industrial Hydraulics*, ©1962, McGraw-Hill Book Co., NY, pp. 237–242.

*Primary Examiner*—Samuel Scott
*Assistant Examiner*—Allen J. Flanigan
*Attorney, Agent, or Firm*—Body, Vickers & Daniels

[57] ABSTRACT

A pilot operated flow regulating valve which can be remotely controlled by varying the energization to a solenoid. The valve consists of a normally-closed, spring-biased, pressure-differential-actuated, main valve element and a pressure-compensated, pilot flow valve employing a solenoid acting like a remotely controllable electromagnetic spring to control the flow of fluid through the pilot valve and the pressure difference across the main valve element.

14 Claims, 6 Drawing Figures

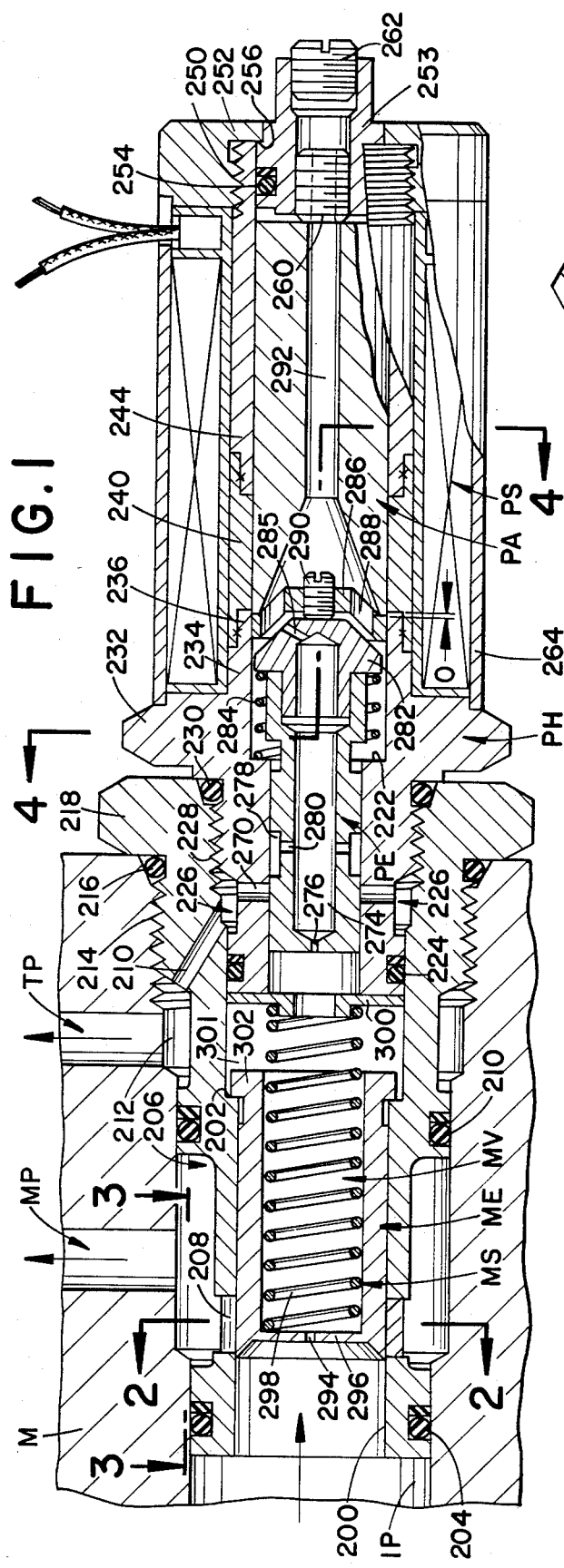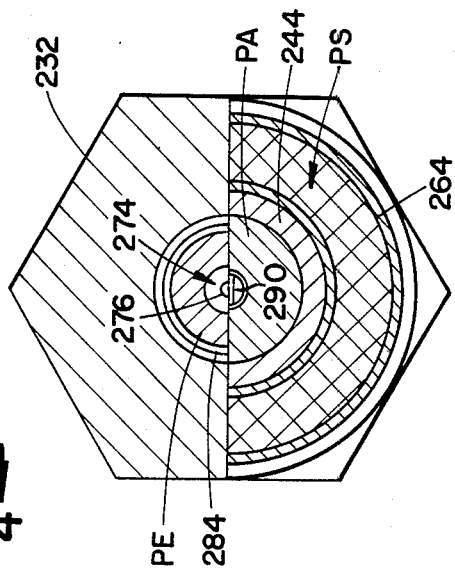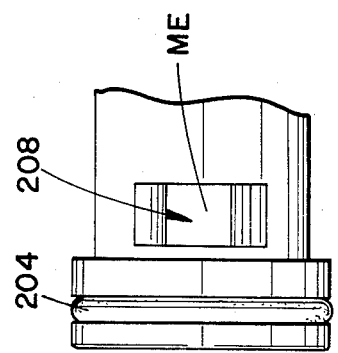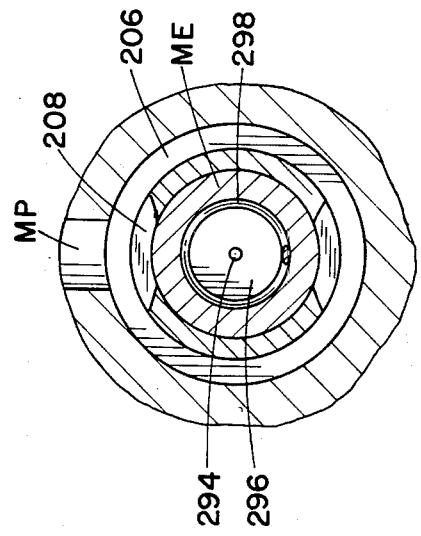

SOLENOID CONTROLLED FLOW VALVE

This invention pertains to the art of fluid valves, and more particularly to an electrically controlled flow valve.

The invention is particularly applicable to hydraulic flow valves operating at pressures up to 6,000 pounds per square inch and will be described with particular reference thereto, although it will be appreciated that the invention has broader applications and may be used in many types of valves either for controlling the flow of liquids or gases.

Flow valves are used extensively in industry to control the volume of fluid flowing from a fixed volume hydraulic pump to a motor or other apparatus, the speed of which must be controlled.

Such valves in the past have usually included an adjustable variable orifice, the opening of which is controlled by a threaded element which may be manually adjusted or driven by a remotely controlled electric motor.

THE INVENTION

The present invention provides a flow valve which overcomes the problems of the prior art, provides a flow valve which may be easily regulated by the amount of electric current supplied to a solenoid coil.

In accordance with the invention, a remotely controllable fluid flow valve is provided, comprised of a three-ported, main valve section including a mechanical spring biased, pressure-differential-actuated, main valve element and a two ported, pressure-compensated, pilot-type flow valve including a solenoid acting as a variable electromagnetic spring to variably control the volume of fluid flowing through the pilot valve and the pressure difference across the main valve element.

More specifically in accordance with the invention, a flow valve is provided comprised of a housing having an elongated cylindrical cavity with a pressure inlet and a first outlet port, a first valve element operable to control the flow of fluid between the ports and having a first surface exposed to inlet pressure and a second oppositely facing surface exposed to pressures in a variable pressure chamber, mechanical spring means lightly biasing the element to an initial position relative to the ports, fixed orifice means communicating the inlet port with the chamber, a second outlet port communicating the chamber to low pressure, a second valve element operable to control the flow of fluid through the second port and an electro-magnetic spring for controlling the position of this second valve element relative to the second port comprised of a solenoid including a solenoid coil, a sleevelike, armature-attracting pole piece and an axially spaced, sleevelike, armature-supporting pole piece with the armature so positioned relative to the pole pieces that as the armature moves into the attracting pole piece, the magnetic force decreases. To provide this, the armature must substantially overlap the supporting pole piece and slightly overlap the attracting pole piece. Furthermore and generally, the attracted end of the armature is concave with the walls of the concavity being either straight, curved or stepped, and with the included angle of the metal being between 10°–80°.

As used in the specification and the claims, "substantially overlapping" means an axial overlap of a distance at least greater than 0.5 inches, and "slightly overlapping" means an axial overlap of a distance such that if the overlap increases, the axial movement force decreases or vice versa. Basically, this represents an overlap of at least greater than about 0 up to about 0.100 inches.

Further in accordance with the invention, the valve is comprised of: a housing having an elongated cylindrical cavity with an inlet port and a main outlet port; a valve element in the form of a piston slidable in the cavity to restrict the outlet port and having one end surface exposed to the inlet pressure and an opposite surface defining with the cavity a variable pressure chamber; mechanical spring means biasing the element to the valve closed position; a fixed orifice through the piston communicating inlet pressure with the variable pressure chamber; an outlet port communicating the variable pressure chamber to low pressure and a pilot valve element movable to restrict this latter port; a magnetically permeable armature operatively associated with the pilot valve element; a solenoid coil and magnetic field poles arranged to exert an axial force on the armature; the armature and the field pole being so arranged that as the armature moves further into one of the field poles, the magnetic force decreases; and, an axially facing orifice operatively associated with the pilot valve element for exerting a flow force thereon and provide pressure compensated flow through the pilot valve.

In essence, when the solenoid is energized to a given level, the valve element is moved to effect communication of the chamber with the pilot valve outlet port and permit flow of fluid through the main valve orifice and the pilot valve orifice in a volume which is pressure compensated, that is, it is constant above a certain minimum pressure regardless of inlet system pressure above that minimum pressure. This pilot flow creates a pressure differential across the main valve element which then is moved to the open position by the pressure differential across the valve element creating a pressure force in opposition to the mechanical spring bias. This permits flow of fluid from the inlet port through the main outlet port in an amount proportional to the pressure differential which will remain constant for all values of inlet pressure above a minimum.

OBJECTS

The principal object of the invention is the provision of a new and improved flow valve which is simple in construction, economical to manufacture and which enables the remote control of fluid flowing therethrough.

Another object of the invention is the provision of a new and improved flow valve which employs a remotely-adjustable, pressure-compensated, flow valve for controlling the volume of fluid flowing through the main valve.

Another object of the invention is the provision of a new and improved flow valve comprised of a spring biased, pressure-differential actuated, main valve element and a remotely-controllable, pressure-compensated pilot flow valve for controlling the pressure differential across the main valve element.

DRAWINGS

The invention may take physical form in certain parts and arrangements of parts, preferred embodiments of which will be described in detail in this specification and illustrated in the accompanying drawings, which form a part hereof and wherein:

FIG. 1 is a side view partly in cross section of a remotely controlled hydraulic flow valve illustrating a preferred embodiment of the invention;

FIGS. 2-4 are cross sectional views of FIG. 1 taken approximately in the line 2—2, 3—3, and 4—4 thereof respectively; and, FIG. 6 shows armature displacement-solenoid voltage curved.

PREFERRED EMBODIMENT

Figure 5:
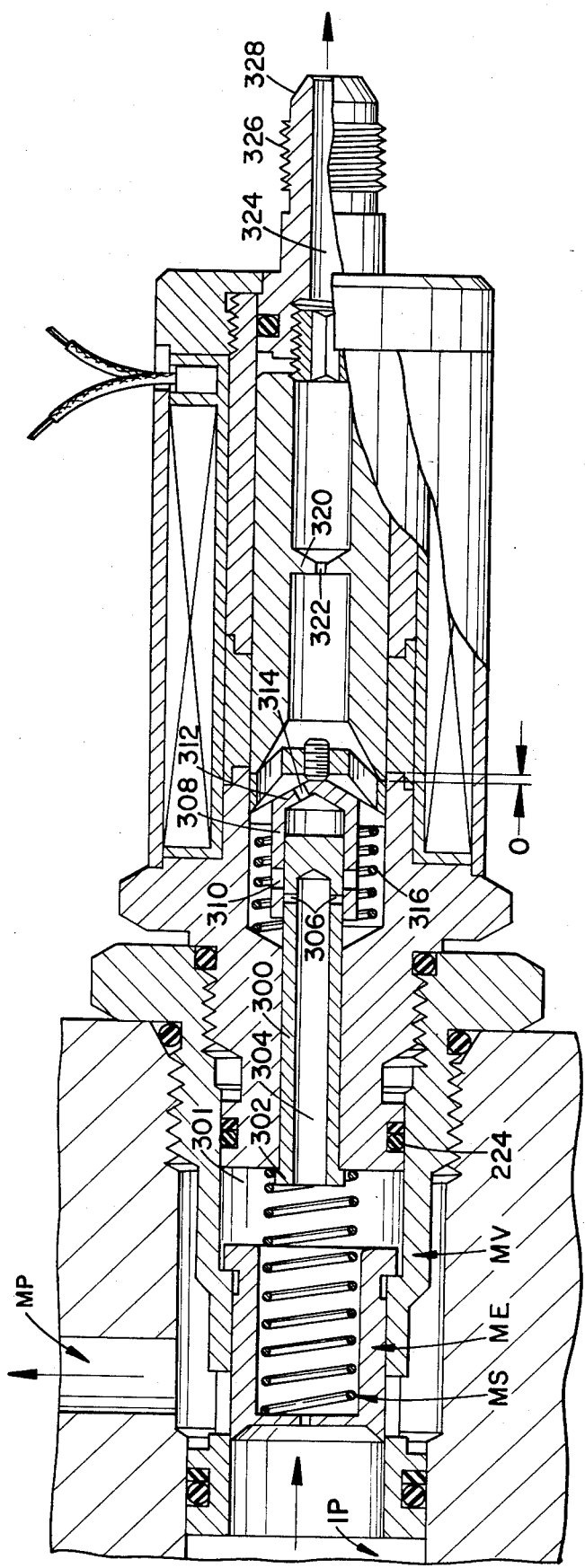

Referring now to the drawings, wherein the showings are for the purpose of illustrating a preferred embodiment of the invention only, and not for the purpose of limiting same, FIG. 1 shows an electrically controlled flow valve assembled with a manifold housing M and including: a main valve MV comprised of a main valve housing MH and a main valve element ME biased to a closed position by a main spring MS; and, a pilot valve PV comprised of a pilot valve housing PH; a pilot valve element PE; a pilot valve armature PA; a solenoid coil PS for creating a magnetic force on the armature PA and biasing it to the left; and a light spring PS for lightly biasing the valve element to the valve closed position.

The manifold housing M forms no part of the present invention and is shown simply for the purposes of illustration. It includes an inlet passage IP, a main outlet passage MP and a tank passage TP.

The main valve housing MH is comprised generally of a single machined member of any desired material, brass, steel, stainless steel or aluminum and has an internal cylindrical passage 200 opening through the left end to form an inlet port and which is counterbored at the right end to provide a lefthand facing shoulder 202. Externally, the main valve housing MH, (reading from left to right) includes: a groove to receive an O-ring seal 204; a portion of reduced diameter to provide with the manifold housing M an outlet manifold 206 to main outlet passage MP; rectangular main outlet ports 208; a groove to receive an O-ring seal 210; a portion of reduced diameter to provide with manifold housing MH an outlet manifold 212 to the tank passage TP; a threaded portion 214 mating with threads on the manifold housing M; a groove to receive an O-ring seal 216 and a portion of a larger diameter 218 which is hexagonally shaped to receive and coact with a wrench or the like.

Additionally, the housing MH has a passage 210 communicating the tank passage manifold 212 with the interior of the main valve housing MH just to the right of the lefthand end of the pilot valve housing PH.

The pilot valve housing PH has an internal cylindrical passage 220 opening to the left and counterbored at its right end to provide a righthand facing shoulder 222. Externally, the pilot valve housing PH (reading from left to right) includes a boss 223 of an outer diameter to fit into the counterbored end of the main housing MH; a groove to receive an O-ring seal 224 which seals against the inner wall of the main valve housing MH; a portion of reduced diameter to provide a manifold 226 communicating with passage 212 and tank port TP; a threaded portion 228 to mate with threads on the inside of the main valve housing, a groove to receive an O-ring seal 230, a portion of larger diameter 232 which has a hexagonal outer shape to receive a wrench and a sleevelike portion 234 extending to the right and externally rabbeted to provide a portion of reduced diameter 236. At least portions 232 and 234 are formed of magnetically permeable material.

The housing PH also includes a sleeve of magnetically nonpermeable material 240 internally rabbeted at both ends and having an inner surface of the same diameter as the inner surface of the sleevelike portion 234.

The pilot valve housing PH also includes a sleeve 244 of magnetically permeable material, externally rabbeted on the left end to mate with the rabbets of the nonmagnetic sleeve 240 and an inner surface having a diameter the same as sleeve 234.

The pilot valve housing PH further includes a cap 248 of magnetically permeable material threaded onto the righthand end of sleeve 244, which cap has a flange 252 extending radially inwardly to a diameter just less than the inner diameter of sleeve 244.

An end sealing member 253 of magnetically nonpermeable material extends into the righthand end of sleeve 244 and has a groove in its outer surface to receive an O-ring seal 254 which engages the inner surface of sleeve 244, and a portion of reduced diameter to provide a shoulder which abuts against the lefthand facing surface of flange 252. Member 253 also has a threaded bore in which a sleeve screw 260 is mounted in the lefthand end and a plug 260 in the righthand end.

Pilot valve solenoid PS surrounds and overlaps sleeves 234, 240 and 244 and includes an outer housing 264 of magnetically permeable material which extends into abutting overlapping relationship with the portions 232 and cap 248 generally as shown.

Adjacent to the lefthand end of pilot housing PH, a pair of crossed drilled openings 270 provide radially opening outlet ports nominally communicating passage 220 with the manifold 226.

Pilot valve element PE is movably supported in passage 220 for the purpose of variably restricting ports 270. Pilot valve element PE in the embodiment shown, is formed of magnetically nonpermeable material and includes a central passage 274 communicated to the lefthand end through an axially facing orifice 276. Pilot valve element PE also includes an external groove 278 communicating with passage 274 by a cross drilled openings 280.

As element PE moves to the left, groove 278 is brought into communication with ports 270 creating a variable orifice the size of which is dependent on the position of the element PE.

The righthand end of pilot valve member PH is counterbored to receive a magnetically nonpermeable insert 282 having on its right end a ported flange of a diameter larger than the outer diameter of pilot valve element PE to provide a lefthand facing shoulder against which a pilot valve spring 284 abuts and at the opposite end abuts against the shoulder 222 to bias the pilot valve element to the right. Spring 284 has a spring rate of one pound per inch, and an initial compression force of 4 ounces. Insert 282 has a drilled passage 285 communicating pressures in bore 274 with the righthand end of the cavity defined by the sleeves 234, 240 and 244.

A magnetically nonpermeable spacer member 286, having axial extending passages 288, is positioned to the right of the insert 282 and has a threaded member 290 abutting against the righthand surface of insert 282. Spacer 286 has a diameter such as to slide freely in sleeve 234.

The pilot valve armature PA is formed of magnetically permeable material and has an internal passage 292 and an outer coating of Teflon or other anti-friction material of a thickness of between 0.001 and 0.003 inches.

The construction and arrangement of the spacer 288, the pilot valve armature PA and the threaded sleeve 260 form no part of the present invention and are described in the copending application of Robert Brundage, one of the coinventors herein, in greater detail.

The main valve element MV is generally in the shape of a cup having an axially facing orifice 294 in its base 296 and is lightly biased to the left by a spring 298 bearing at its left end against the base of the cup 296 and at its right end against a flanged washer 300 which abuts against the lefthand end of the pilot valve housing PH. Main valve element MV defines with cavity 200, a variable pressure chamber 301. Spring 298 in the preferred embodiment has a spring rate of 80 pounds per inch and an initial compression force of 5 pounds.

The main valve element MV has a flange 302 on its righthand end which abuts against the shoulder 202 to limit its movement to the left. The lefthand end of the valve element extends to the left of the lefthand side of the main outlet ports 208 with a slight overlap generally as shown. Movement of the main valve element ME to the right, restrictively communicates the inlet port with port 208 allowing flow of fluid therethrough in an amount proportional to the amount of opening of 208 and the inlet pressure.

POWER SOURCE

The power source for the pressure compensated flow valve is preferably a variable D.C. source having a minimum output voltage sufficient to create an axial magnetic force on armature PA just equal to the force of spring 284 when groove 278 is just about to communicate with openings 280, this minimum voltage being present even though the controller for the source indicates zero output voltage. As such, even a slight movement of the controller towards increased voltage results in movement of the armature PA and a change in the relative position of groove 278 and ports 280. This minimum voltage is about 2 volts.

Preferably, the source also superimposes a conventional square wave dither voltage on the D.C. output voltage.

Figure 6:
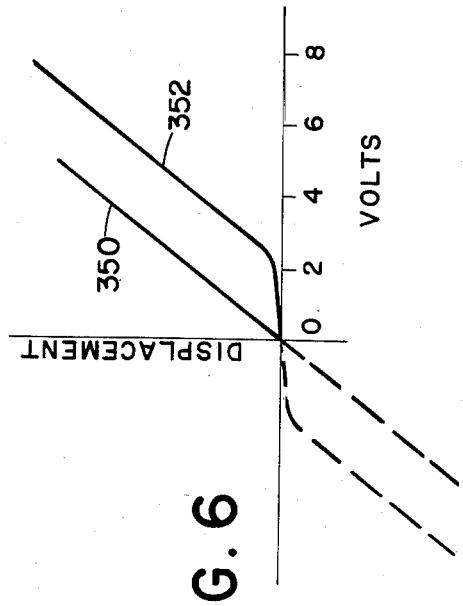

Curve 350 of FIG. 6 shows the armature displacement-vs. controller position (apparent to the operator) when using two volts minimum compared to a similar curve 352 where the minimum output voltage is zero, the curves on the negative sides of the axes being what would be true if the armature were to move bidirectionally as in some of my earlier applications.

With this arrangement, the controller can be calibrated directly in fluid volume per minute of flow.

OPERATION

In operation, port IP is at high pressure and port 270 is at low pressure. Orifices 294, chamber 301, orifice 276, the inside of element PE and a variable orifice 270-278, formed by the variable communication of port 270 and groove 278 are all in hydraulic series between the high pressure and low pressure.

When variable orifice 270-278 is open, fluid flows through all three orifices and the pressure differential divides across each of the three. The pressure differential across orifice 294 creates a pressure force to the right on main valve element ME. The pressure differential across orifice 276 creates a pressure force to the right on pilot valve element PE. The pressure differential across variable orifice 270-278 is radial, and around a 360° circumference and the radial pressure forces balance out.

With the solenoid PS unenergized, the various valve elements will be in the position shown with variable orifice 270-278 closed. High inlet pressure is communicated through orifice 294, orifice 276 and orifice 285 such that in the positions shown, the entire inside of the two housings MH, PH will be at high inlet pressure. Valve member ME is thus in hydraulic pressure force balance and member ME is biased to the left by spring 298 to close the communication of inlet pressure with ports 208.

Pilot valve element PE is also in hydraulic pressure force balance and (along with spacer 286 and the armature PA) is biased lightly to the right by spring 284 such that the variable orifice 270-278 is closed. The function of this spring is only to return the element PE to close variable orifice 270-278 when the solenoid is unenergized.

In this position, the lefthand end of armature PA has an overlap 0 with the righthand end of the rabbeted portion 236 and the lands between groove 278 and ports 270 have a slight overlap to close variable orifice 270-278.

When the power source is first energized, even though its controller indicates 0 output voltage, its minimum output voltage energizes solenoid PA to create a small magnetic force to the left on armature PA just less than or equal to the initial force of spring 284. Thus, any further increase in the output voltage of the power source will cause the armature PA and the pilot valve element PE to move to the left against the light spring force of spring 284.

When the solenoid is further energized, the magnetic force created on armature PA causes it to move further to the left against the light bias of spring 284 bringing groove 278 into communication with pilot valve outlet ports 270, thus, in effect, opening the variable orifice 270-278. Hydraulic fluid then flows through orifices 294, 276 and the variable orifice 270-278. A pressure differential exists across orifice 294. This pressure differential creates a pressure force to the right on the main valve element ME causing it to move to the right against the bias spring 294 and communicating the inlet port IP with ports 208.

A pressure differential also exists across orifice 276 creating a pressure force to the right on pilot valve element PE, in opposition to the magnetic force and causing pilot valve element PE to move to the right until the pressure force plus the light force of spring 284 are equal to the magnetic force.

Importantly, as the pressure force moves the pilot valve element PE and the armature PA to the right, the magnetic force increases similar to the increase if a conventional coil spring were employed in place of the solenoid-armature arrangement except that it increases at a rising rate.

If the inlet pressure at port IP should drop for any reason, the pressure differentials across orifices 297 and 276 will also drop, reducing the pressure force to the right on pilot valve element PE. If this happens, the magnetic force of armature PA to the left is greater than the pressure differential force to the right and the magnetic force moves the pilot valve element PE to the left to further open variable orifice 270-278. This further opening of the variable orifice 270-278 decreases the pressure drop thereacross and increases the pressure drop across orifice 276 and thus the pressure differential force to the right on the pilot valve element 276. This further opening continues until the magnetic and pressure differential forces are in balance. The rate of flow of fluid through the pilot valve is constant with variations in inlet pressure. The pilot flow valve is pressure compensated. Inasmuch as orifice 294 is in series with the pilot flow valve. Flow through orifices 294, 296 and 270–278 is also constant with inlet pressure variations.

By varying the energization of solenoid coil PS, the magnetic force to the left on armature PA can be varied, which will thus vary the rate of fluid flow through orifices 294 and 276. Variation in the flow of fluid through orifice 294 varies the pressure force to the right against the bias of spring 298 resulting in movement of the main valve element ME to vary the communication of inlet with the outlet 208. The rectangular ports 208 provide a fluid flow directly proportional to the movement of main valve element ME.

It is important that the overlap of the left end of armature PA and the right end of a reduced portion of 236 of sleeve 230 be such that when armature PA moves to the left against the force of spring 284, the magnetic force decreases. In effect, the solenoid coil and the armature create what may be termed an electro-magnetic spring, the force of which may be varied by varying the energization of the solenoid PS.

A flow valve results whereby a constant flow through the valve can be obtained for any level of solenoid PS energization.

The righthand surface of main valve element PE defines with the cavity a variable pressure chamber which pressure varies with the amount of fluid flowing through pilot valve PV as determined by the energization of solenoid coild PS. Obviously, the orifice 294 communicating the inlet port with this variable volume chamber can be other than as shown and through the housing or through a separate passage externally of the housing.

Above a predetermined inlet pressure, the pressure flow force to the right on element PE is a function of the pressure drop across and thus the diameter of orifice 276 and the area of the left end of element PE, both of which are determined at the time of manufacture to correspond to the maximum magnetic force capabilities of the solenoid-armature combination.

In the preferred embodiment, the diameter of element PE and orifice 276 are 0.500 inches and 0.042 inches respectively. Solenoid PS has 940 turns of 24 gage copper wire and a 9 ohm resistance.

In a similar manner, the pressure force an ME is a function of the pressure drop across, and thus the diameter of orifice 294 multiplied by the area of the left end of element ME. In the preferred embodiment, the diameters of element ME and orifice 294 are 0.625 inches and 0.03125 inches respectively. These dimensions are proportioned to act with the spring rate of spring 298.

The valve shown in FIG. 1 is what may be termed a normally closed valve. It can be made normally open by reversing the direction of the magnetic force on the armature PA by having the left end of the armature substantially overlapping the lefthand solenoid pole piece and the right end slightly overlapping the righthand solenoid pole piece and tapering the end of armature PA toward its attracted end rather than making the end concave as is shown generally in FIG. 6 of application Ser. No. 378,133. By so changing the shape of the attracted end of armature PA, the magnetic force increases with increasing overlap. A spring is then placed to the right of armature PA to bias the armature and the valve element to the left with a force to at least equal the maximum pressure flow force to the right such that the ports 270 and 280 in FIG. 1 are in communication. When the solenoid PS is unenergized, fluid flows through orifice 276 to create a flow force to the right against but less than the spring force.

When solenoid PS is energized, it acts against the spring force allowing valve elements PE to move to the partially or fully closed position.

FIG. 5 is a view similar to FIG. 1 showing an alternative embodiment of the invention wherein communication to the tank port TP is through the righthand end of the valve and the pressure compensating orifice is formed in the magnetically permeable armature rather than in the valve element itself.

In this embodiment, an elongated cuplike member 300 is positioned in sealed relationship with the walls of cavity 220 and has a flange 302 on its lefthand end which abuts against the lefthand end surface of pilot valve housing PH and an elongated passage 304 opening into the variable pressure chamber 301 of the main valve MV. Member 300 also has radially extending ports 306 communicating with the inside of the pilot valve housing PH. In this embodiment of the invention, the pilot valve element PE is in the shape of a cup having cylindrical side walls 308 slidable in sealed relationship with the outside of the member 300 which has radially extending ports 310 adapted to selectively communicate with the ports 306. The cup has a base 312 with a port 314 therethrough to communicate the space to the right of member 300 to the interior of the pilot housing PH.

The member 300 also has a ported flange 314 on its righthand end against which a spring 316 bears on its righthand end and on its lefthand end against the end of the cavity to bias the pilot valve element PE to the right and the ports 306 and 310 out of communication.

The armature PA is generally the same as the armature in the preferred embodiment with the exception that there is a wall 320 intermediate the ends of passage 292 in which an axially facing orifice 322 is provided.

In addition, member 253, instead of having a plug 262 at the righthand end, has a through passage and connecting means to a hydraulic fitting, such as the threads 326 and conical seat 328.

In operation, all fluid flowing through the ports 306, 310 flows axially through the armature PA and orifice 322 to create a flow force on the armature in opposition to the magnetic force developed by the solenoid PS.

The invention has been described with reference to preferred embodiments. Obviously, modifications and alterations will occur to others upon reading and understanding of this specification, and it is our intention to include all such modifications and alterations insofar as they come in the scope of the appended claims.

Having described our invention, we claim:

1. An electrically controlled pilot actuated flow valve comprised of:
   a. a housing having an elongated cylindrical cavity with a pressure inlet port and at least one radially facing main outlet port;
   b. a main valve element operable to control the flow of fluid between said inlet and outlet ports;
   c. said main element having a first axially facing surface exposed to inlet pressure and a second oppositely facing surface defining with said cavity a variable pressure chamber;

d. means biasing said main valve element to an initial position relative to said inlet and outlet ports;

e. a main valve orifice communicating said inlet port with said variable pressure chamber;

f. a pilot valve outlet port adapted to communicate said variable pressure chamber to low pressure;

g. a pilot valve element operable to control the flow of fluid from said chamber through said pilot valve outlet port;

h. pressure differential responsive means biasing said pilot valve element in one direction to restrict said flow from said chamber;

i. an armature supporting field pole and an axially spaced armature attracting field pole;

j. a solenoid coil surrounding said poles; and, k. a magnetically permeable armature operatively associated with said pilot valve element and having a first end substantially overlapping said supporting field pole and a second end slightly overlapping said attracting field pole and operable when said coil is energized to exert a magnetic force on said pilot valve element in an opposite direction to move it to a new position relative to said pilot valve outlet port.

2. The valve of claim 1 wherein said means includes an axially facing orifice operatively associated with said pilot valve element through which all fluid flowing through said pilot valve outlet port flows to create a pressure force on said pilot valve element opposite to magnetic forces on said armature.

3. The valve of claim 1 wherein said pilot valve outlet port opens radially into said variable pressure chamber and said pilot valve element moves axially.

4. The valve of claim 2 wherein said pilot valve outlet port opens radially into said variable pressure chamber and said pilot valve element moves axially.

5. The valve of claim 1 wherein an edge of said main outlet port adjacent the inlet port extends circumferentially and said main valve element moves axially.

6. The valve of claim 2 wherein an edge of said main outlet port adjacent the inlet port extends circumferentially and said main valve element moves axially.

7. The valve of claim 1 wherein said main outlet port is rectangular with one wall extending circumferentially.

8. The valve of claim 2 wherein said main outlet port is rectangular with one wall extending circumferentially.

9. An electrically controlled flow valve comprising in combination: a spring-biased, normally-closed, pressure-differential-actuated main flow valve having a pressure inlet, a main outlet and a variable pressure outlet with the difference in pressures between pressure inlet and variable pressure outlet determining the communication between pressure inlet and main outlet; and a pressure compensated pilot flow valve in series with said variable pressure outlet and a low pressure outlet, and variable spring means for establishing the rate of flow of fluid through said pilot valve.

10. The valve of claim 3 wherein said spring means include an electro-magnetic spring biasing said pilot valve to the open position in an amount proportional to the electrical energization of said electro-magnetic spring.

11. The valve of claim 3 wherein mechanical spring means bias said pilot valve to the open position and a solenoid-armature arrangement creates a force opposing the force of said mechanical spring to move the pilot valve to a partially closed position in an amount proportional to the electrical energization of said solenoid.

12. In an electrically controlled flow valve comprising in combination: a spring-biased, pressure-differential actuated main valve; an adjustable pilot flow valve, the flow of which, when varied, varies the pressure difference on said main valve; the improvement which comprises said pilot flow valve being of the pressure compensated type; and electro-magnetic means for varying the flow of fluid through said pilot valve and the pressure differential across said main valve.

13. An electrically controlled pilot actuated flow valve comprised of:

a. a housing having an elongated cylindrical cavity with a pressure inlet port and at least one radially facing main outlet port;

b. a main valve element operable to control the flow of fluid between said ports;

c. said main element having a first axially facing surface exposed to inlet pressure and a second oppositely facing surface defining with said cavity a first variable pressure chamber;

d. a pilot valve element having a first axially facing surface exposed to the pressure in said first variable pressure chamber and a second axially facing surface defining with said cavity a second variable pressure chamber;

e. main valve means biasing said main element to an initial closed position relative to said ports;

f. a main valve orifice communicating said inlet port with said first chamber;

g. a pilot valve outlet port adapted to communicate said second variable pressure chamber to low pressure;

h. said pilot valve element being operable to control the flow of fluid from said second chamber through said pilot valve outlet port;

i. means in the form of an orifice communicating said variable pressure chambers, resulting in pressure differentials biasing said pilot valve element in one direction to restrict said flow from said second chamber; and, j. other means for adjustably and resiliently biasing said pilot valve element in the opposite direction to permit flow from said second chamber to said pilot valve outlet port.

14. The valve of claim 1 wherein said means of subparagraph i includes an orifice operatively associated with said pilot valve element through which all fluid flowing through said pilot valve outlet port flows, said element having axially oppositely facing surfaces exposed to the pressure differential across said orifice to create a pressure differential force on said pilot valve element opposite to said bias means of subparagraph i.

* * * * *